(12) United States Patent
Warren et al.

(10) Patent No.: US 7,950,628 B2
(45) Date of Patent: May 31, 2011

(54) FLAT RAILCAR WORK PLATFORM AND WHEEL ASSEMBLY WITH LOCKING MECHANISM

(75) Inventors: Sam Warren, Mount Airy, MD (US); Allen Wonder, Abingdon, MD (US)

(73) Assignee: United States Holdings LLC, Baltimore, MD (US)

( * ) Notice: Subject to any disclaimer, the term of this patent is extended or adjusted under 35 U.S.C. 154(b) by 155 days.

(21) Appl. No.: 12/407,242

(22) Filed: Mar. 19, 2009

(65) Prior Publication Data

US 2010/0123111 A1 May 20, 2010

Related U.S. Application Data

(60) Provisional application No. 61/116,339, filed on Nov. 20, 2008.

(51) Int. Cl.
B56F 3/22 (2006.01)
(52) U.S. Cl. .......................... 254/122; 254/134; 254/2 C
(58) Field of Classification Search .................. 254/122, 254/126, 124, 134, 2 C
See application file for complete search history.

(56) References Cited

U.S. PATENT DOCUMENTS

| 2,741,830 | A | * | 4/1956 | Lewis | 269/17 |
| 3,623,707 | A | * | 11/1971 | Klopp | 254/22 |
| 4,896,869 | A | * | 1/1990 | Takekoshi | 269/60 |
| 5,695,173 | A | * | 12/1997 | Ochoa et al. | 254/122 |
| 5,855,359 | A | * | 1/1999 | Chipperfield | 254/88 |
| 6,098,961 | A | * | 8/2000 | Gionet | 254/122 |
| 6,533,260 | B1 | * | 3/2003 | Mock | 269/17 |
| 6,591,665 | B2 | * | 7/2003 | Sondey | 73/116.02 |
| 6,779,787 | B2 | * | 8/2004 | Gryder et al. | 269/71 |
| 2010/0123111 | A1 | * | 5/2010 | Warren et al. | 254/2 C |

* cited by examiner

*Primary Examiner* — Lee D Wilson
(74) *Attorney, Agent, or Firm* — Laubscher & Laubscher, PC

(57) ABSTRACT

An extendable railcar work platform includes one or more work platform sections each including a set of wheels, a locking mechanism associated with each wheel and a guide system. The system enables workers to safely work above an electrified third rail such as in a subway or railway tunnel. The platform may be in a first retracted position for transit or in a laterally extended or vertically extended position to enable a worker to access and work on a tunnel wall. The platform may be extended to both sides of the railcar and, if the platform includes more than one section, the individual sections may be simultaneously extended to opposite sides of the railcar. Each work platform section includes a floor or base and safety rails around all four sides of the section.

9 Claims, 3 Drawing Sheets

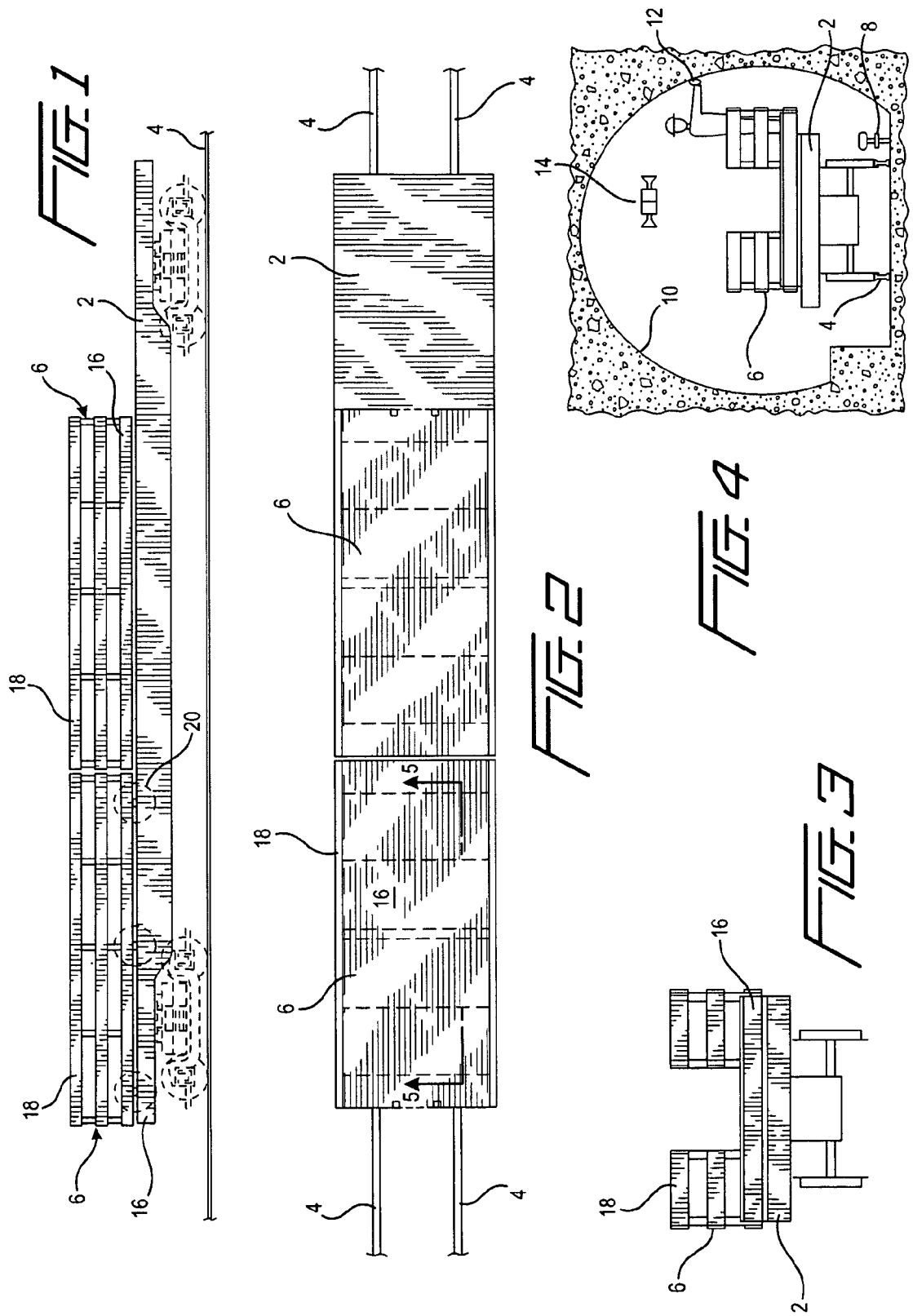

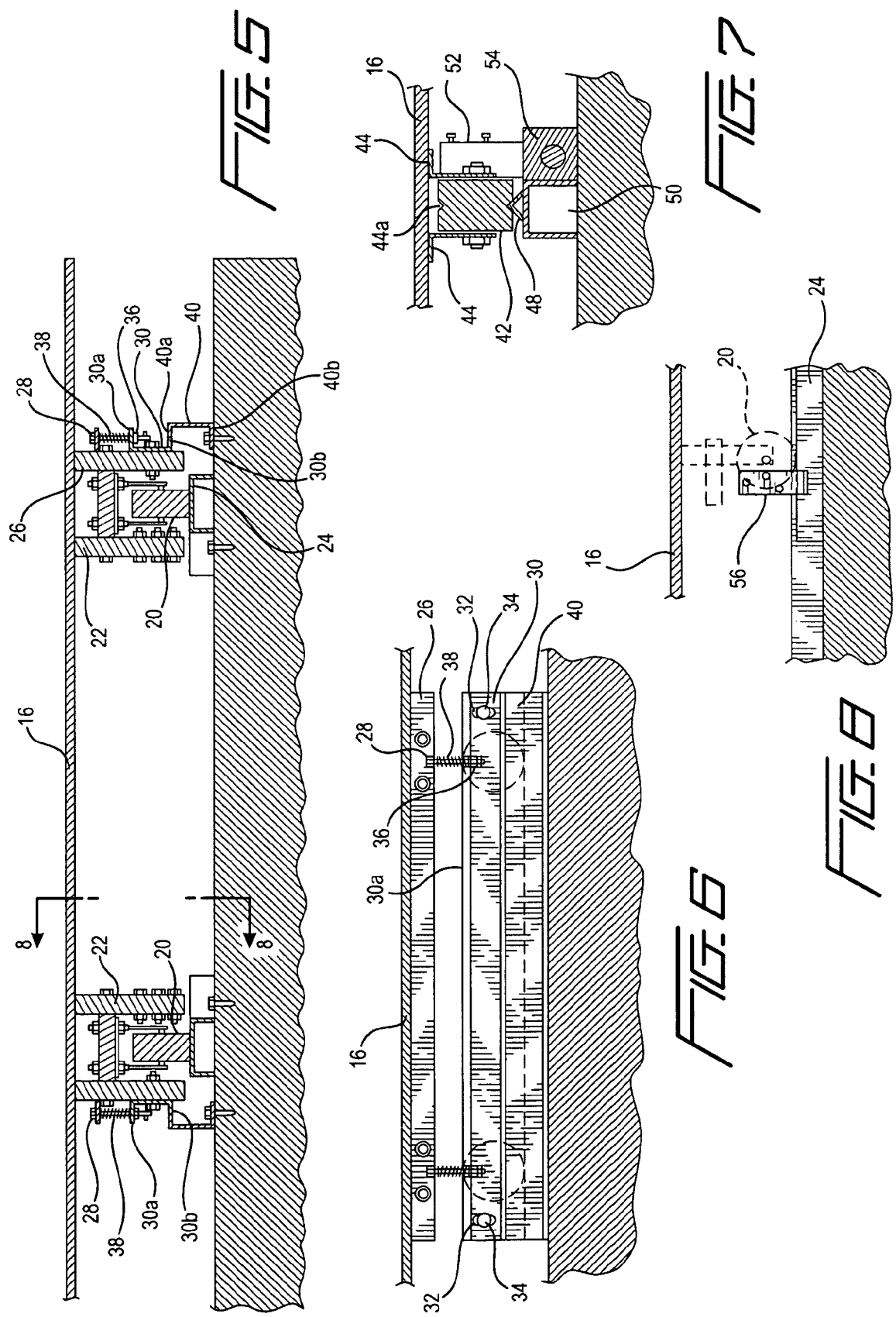

US 7,950,628 B2

FLAT RAILCAR WORK PLATFORM AND WHEEL ASSEMBLY WITH LOCKING MECHANISM

BACKGROUND OF THE INVENTION

The present invention relates generally to flat railcar assemblies and more particularly to a flat railcar work platform having a wheel assembly and a unique locking mechanism for positioning the platform.

In order to safely work on rail lines having an electrified third rail, workers normally must shut of the electricity being supplied to the third rail. In addition, work on rail lines in tunnels and requires workers to access portions of the tunnel out of their immediate reach. This can be inconvenient and time consuming because the switches to turn the electricity on and off are not always located close to the work area and because other equipment is required to reach certain portions of the tunnel.

SUMMARY OF THE INVENTION

According to the invention, a work platform for a flat railcar includes a base and a plurality of transport wheels connected with the base. The base is thus movable relative to the flatcar between extended and retracted positions. A locking mechanism is connected with the base and operable between a release condition which allows movement of the base relative to the upper surface of the railcar and a locked condition which prevents movement of the base relative to the railcar.

The locking mechanism includes a first rail connected with the base and a second rail connected with the railcar. The first and second rails are arranged in parallel and extend transverse to the longitudinal axis of the railcar. Each rail each includes a flange along its length. The flanges are arranged opposite each other and serve to interlock the rails to maintain the platform in a horizontal position during movement. At least one bolt passes through aligned openings in the flanges of the first and second rails. As the bolt is tightened, the rails are drawn together to prevent relative movement therebetween and lock the platform in position.

The platform also includes a guide wheel which engages a rail mounted on the flatcar. The guide wheel insures that the platform moves in a linear direction between the extended and retracted positions.

According to a further embodiment of the invention, a lift mechanism is provided between the flatcar and the platform so that the platform may be raised and lowered relative to the flatcar. Thus, the platform may be positioned both laterally and vertically so that workers can reach all areas of the inner wall of a tunnel.

BRIEF DESCRIPTION OF THE FIGURES

Other objects and advantages of the invention will become apparent from a study of the following specification when viewed in the light of the accompanying drawing, in which:

FIG. 1 is a side plan view of a work platform according to the invention mounted on a flat railcar;

FIG. 2 is a top plan view of the work platform and railcar of FIG. 1;

FIG. 3 is an end plan view of the work platform and railcar of FIG. 1;

FIG. 4 is an end view showing the work platform and railcar in a tunnel with the platform in an extended position;

FIG. 5 is a sectional view of the work platform taken along lines 5-5 of FIG. 2;

FIG. 6 is a side view of the rails of the locking assembly for the platform according to the invention;

FIG. 7 is a detailed view of the guide wheel for the work platform according to the invention;

FIG. 8 is a sectional view taken along lines 8-8 of FIG. 5 showing a stop mechanism for a transport wheel of the work platform.

DETAILED DESCRIPTION

Figure 9:
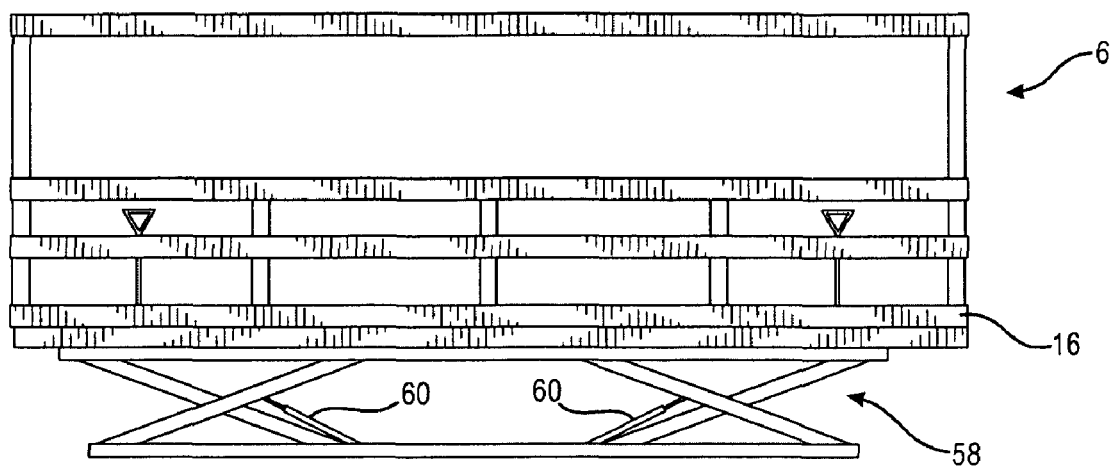
FIGS. 9 and 10 are side and end views of a vertical lift mechanism for the work platform according to the invention.
Figure 10:
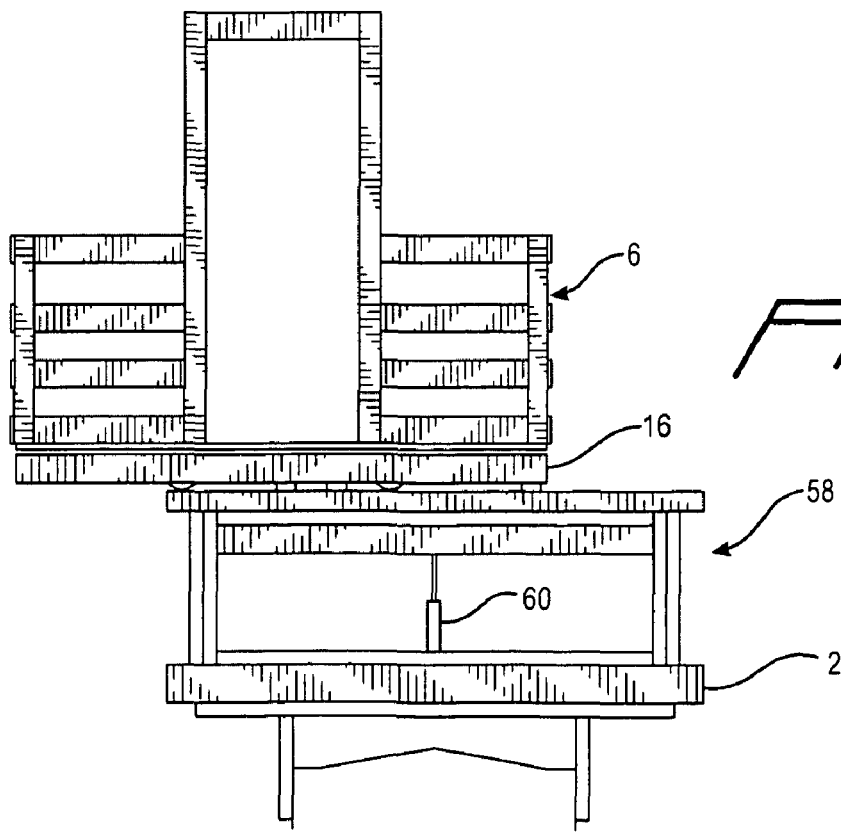

Referring first to FIGS. 1-3, there is shown a flat railcar 2 arranged on tracks 4 and having two work platforms 6 according to the invention mounted thereon. It will be appreciated that a single platform may be mounted on the flatcar and that the work platform may have different dimensions. It has been found that a work platform having a length generally one third the length of the flatcar and a width corresponding to the flatcar is suitable for accommodating a number of workers and their equipment. The work platforms are arranged on a portion of the flatcar leaving an area for other equipment and supplies.

The work platform is particularly suitable for use on rail flatcars to perform repairs in tunnels and especially subway tunnels. Referring to FIG. 4, most subway systems utilize a third rail 8 which is energized to provide electricity to the subway cars which is used by motors in the cars to propel the cars along the tracks and which is used to power the lights, ventilation and other systems in the subway car. The subway systems also include portions above ground and underground. The underground portions pass through tunnels as shown in FIG. 4. The inner wall 10 of the tunnel typically has cables 12 and lights 14 mounted thereon. It is often necessary to perform repairs on the cables and lights and the inner wall portions of the subway tunnels. The work platform according to the invention enables a worker to safely reach all interior portions of the tunnel without coming in contact with the energized third rail and without requiring that the third rail be de-energized.

The work platform includes a flat base 16 having side rails 18 connected with the edges thereof. The underside of the base has a plurality of transport wheels 20 which enable the platform to move laterally between a retracted position as shown in FIGS. 2 and 3 and an extended position as shown in FIG. 4.

Referring now to FIG. 5, the transport wheels 20 are preferably arranged in spaced pairs with the transport wheel of each pair being arranged on opposite sides of the platform. Each wheel is arranged within a frame 22 depending from the platform base. Although the transport wheels could traverse the upper surface of the flat railcar, it is preferred to mount support beams 24 on the upper surface of the railcar. The support beams extend laterally across the upper surface, normal to the longitudinal axis of the railcar.

A locking mechanism is provided to prevent the work platform from moving when desired. The locking mechanism will be described with reference to FIGS. 5 and 6. The outer surface of each frame 22 has a bracket 26 connected therewith toward the top of the frame. The bracket contains an opening for receiving a bolt 28. The bottom portion of the bolt passes through a rail 30. More particularly, the rail contains at least one slot 32 for receiving a fastener 34 connected with the frame. The slot allows the rail to move vertically relative to the frame. The rail has a C-shaped configuration and upper and lower flanges 30a and 30b. The lower end of the bolt 28 passes through an opening in the upper flange 30a and includes a nut 36 on the lower end thereof. As the bolt is tightened, the rail is drawn upwardly relative to the frame 22. As the bolt is loosened, the rail moves downwardly under the force of a spring 38 arranged on the bolt. A further rail 40 is connected with the railcar. The rail 40 also includes upper and lower flanges 40a and 40b. As shown in FIG. 5, the upper flange 40a of the rail 40 and the lower flange 30b of the rail 30 are arranged opposite each other, with the rail flanges overlapping. When the bolt 28 is tightened to raise the rail 30, the lower flange 30b thereof abuts against the upper flange 40a of the rail 40 so that relative movement between the rails is prevented. This locks the work platform into a fixed position. When the bolt 28 is loosened, the rail 30 is released from the rail 40 and the work platform is movable between its extended and retracted positions.

It will be appreciated from FIG. 4 that while the platform may be extended in one direction over the third rail 8 and thus protect the workers from coming into contact with the third rail, the platform may also be extended in the other direction relative to the railcar to work on the opposite tunnel wall. Even as the platform is extended, the rail flanges 30b and 40a are adjacent to one another. Should the platform begin to tilt as it is extended with workers on the remote portions thereof, the rail flanges engage to prevent excessive tilting of the platform.

In addition to the transport wheels 20, the platform includes at least one guide wheel 42 preferably arranged between the transport wheels. Referring to FIG. 7, the guide wheel is suspended from the base 16 of the platform via brackets 44. The wheel preferably contains a circumferential groove 44a which engages a track 48 mounted on the railcar. The track preferably includes a base 50. The grooved wheel insures that the platform moves in a linear direction. A travel bar 52 is connected with the guide wheel assembly and a motor 54 is connected with the base 50 of the track 48 to control the movement of the platform when the locking mechanism is released.

In order to limit the extent of travel of the platform in the extended position, a stop 56 is provided adjacent to at least one of the transport wheels as shown in FIG. 8. The stop is preferably connected with the support beams 24.

According to another embodiment of the invention, the work platform 6 can be mounted on a lift assembly 58 which in turn is mounted on the flat railcar. The lift includes hydraulic cylinders 60 which raise and lower the work platform relative to the railcar. Other lift mechanisms such as electric or pneumatic motors may be used to operate the lift.

A control device (not shown) is preferably provided on the side rails of the platform for use by the workers to position the platform as desired. The control device can be used to operate the bolts 28 of the locking mechanism to engage and release the platform, the motor 54 to displace the platform laterally, and the lift mechanism to raise and lower the platform.

While the preferred forms and embodiments of the invention have been illustrated and described, it will be apparent to those of ordinary skill in the art that various changes and modifications may be made without deviating from the inventive concepts set forth above.

What is claimed is:

1. A work platform for a railcar having a horizontal upper surface and a longitudinal axis, comprising
   (a) a lower base connected with the railcar upper surface, said lower base comprising a lift assembly for moving said lower base vertically relative to said railcar upper surface;
   (b) an upper base arranged parallel with the railcar upper surface and including at least two spaced pairs of transport wheels connected with said upper base so that said upper base is movable laterally relative to the railcar longitudinal axis between extended and retracted positions parallel to said lower base;
   (c) a locking mechanism connected with said upper base and operable between a release condition which allows movement of said base relative to an upper surface said lower base and a locked condition which prevents movement of said upper base relative to said lower base.

2. A work platform as defined in claim 1, wherein said locking mechanism comprises
   (a) a first rail connected with said upper base and a second rail connected with said lower base, said first and second rails each including a flange arranged opposite one another; and
   (b) a displacement assembly for clamping said flanges of said first and second rails together to prevent movement of said first rail flange relative to said second rail flange.

3. A work platform as defined in claim 2, wherein said displacement mechanism comprises a bolt which is operable to draw said first rail flange against said second rail flange when said locking mechanism is in the locked condition.

4. A work platform as defined in claim 2, wherein said upper base further includes at least one guide wheel for maintaining movement of said upper base in a linear direction between the extended and retracted positions.

5. A work platform as defined in claim 3, wherein said guide wheel includes a groove in an outer surface for engaging a guide rail connected with said lower base.

6. A work platform as defined in claim 4, wherein said upper base further includes a travel bar arranged adjacent to said guide wheel for displacing said upper base relative to said lower base.

7. A work platform as defined in claim 6, wherein said guide rail includes a motor for driving said travel bar.

8. A work platform as defined in claim 4, and further including at least one stop for intercepting at least one transport wheel to limit the extended position of said upper base.

9. A work platform as defined in claim 1, wherein said lift assembly comprises at least one hydraulic jack.

* * * * *